Figures 1, 2:
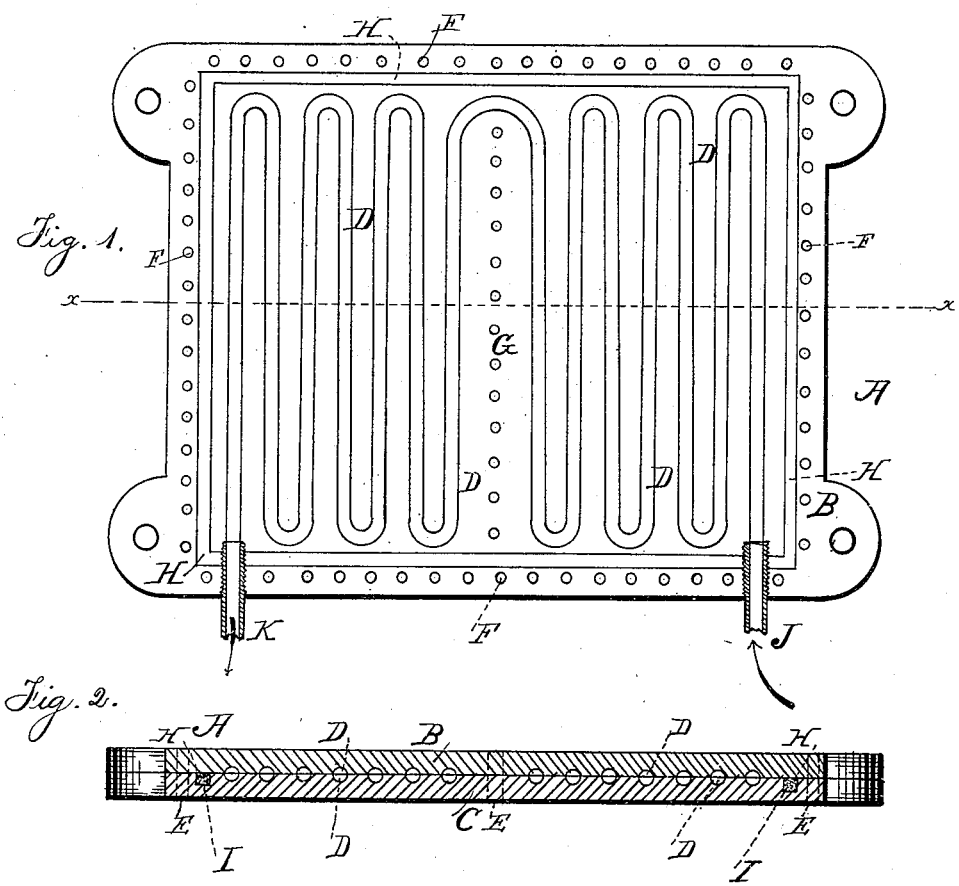

(No Model.)

J. W. HYATT.
STEAM TABLE.

No. 258,762. Patented May 30, 1882.

Witnesses:
Chas. C. Gill
Herman Gustow

Inventor:
John W. Hyatt
By his Attys.
Cox and Cox

UNITED STATES PATENT OFFICE.

JOHN W. HYATT, OF NEWARK, NEW JERSEY.

STEAM-TABLE.

SPECIFICATION forming part of Letters Patent No. 258,762, dated May 30, 1882.

Application filed July 23, 1881. (No model.)

*To all whom it may concern:*

Be it known that I, JOHN W. HYATT, of Newark, in the county of Essex and State of New Jersey, have invented a new and useful Improvement in Steam-Tables, of which the following is a specification, reference being had to the accompanying drawings.

The invention relates to an improvement in steam-tables; and it consists in a table composed of two plates having in one or both of their inner faces a channel or passage for the steam and a groove surrounding the steam-passage, and adapted to contain elastic packing, whereby when the two plates are brought together their union will form a steam-tight joint. When grooves are formed in both the inner faces of the plates they will be arranged in corresponding positions, so as to come opposite to each other when the plates are united, and thus form a complete channel for the steam, one section of the same being in each plate. The two plates composing the table may be of any desirable form, and will be supplied with a series of apertures along their edge for the reception of bolts, rivets, or screws, whereby the two sections may be firmly secured together. The groove above mentioned for the packing is preferably cast or planed in the inner face of one of the plates just within the line described by the apertures, and the packing will by preference be a composition of rubber, graphite, and sulphur, which I prefer to place in the groove in a soft state, since the composition will vulcanize by the heat of the steam when the table is used. The packing thus formed will always have sufficient elasticity and adhesive qualities to preserve its form and answer the purposes for which it is employed. The line of packing incloses the steam passage or channel, which will coil over the greater portion of the plates, and will be provided with a proper inlet and outlet.

The object of the invention is to produce a steam-table which may be constructed with less material than the tables now made employ without losing any of the strength and durability required, and which may consequently be heated or cooled more rapidly and effectually. The purpose of the steam passage or channel is to conduct the steam or the cooling agent to every part of the table, and thus heat or cool it uniformly and with great rapidity. It is highly desirable under many circumstances to heat or cool the table without loss of time. By using light material in connection with the passage made to traverse the whole interior surface of the table I am enabled to accomplish this result in a very satisfactory and successful way. By employing the elastic packing I am enabled to provide for the contact of two metal surfaces, which makes the table sufficiently strong to bear the greatest pressure, while the construction is such that an effectual means of heating and cooling the table with rapidity is preserved.

The steam-table herein described is designed especially for use in connection with processes of molding material by subjecting the same to heat and pressure in dies. In these processes the usual steps are to first insert the material in the dies, and then place the latter between two steam-tables and put the whole into a hydraulic press, applying both heat and pressure.

I do not limit myself to any special use of the steam-table, since they are applicable for employment in any connection in which steam-tables are customarily used.

In the accompanying drawings, Figure 1 is a face view of the inner portion of one section of the table, and Fig. 2 is a vertical section through the line $x\,x$ of Fig. 1.

A indicates the table, composed of the two halves B C, in each of which D represents a section of the passage or channel for the steam. The two halves B C are secured together by rivets, bolts, or screws E passing through the threaded apertures F, around the edges of the plates, and the line of apertures G, passing across the center of them, a sufficient number being employed to resist the internal strain on the plates. The groove H is planed or cast in one of the plates B C, just within the series of apertures F, and contains the packing I, which, as aforesaid, will preferably be a composition consisting of rubber, graphite, and sulphur, placed in the groove in a soft state, and then vulcanized.

The steam way or channel may be circular or rectangular in cross-section, though the circular form is preferred, and will be supplied with an inlet, J, and an outlet, K.

It is plain that when steam or a cooling agent is allowed to enter the passage it will circulate entirely through the interior of the table and affect the temperature of all its parts uniformly and rapidly. The steam-table described is capable of use in any connection where material is to be subjected to the action of heat and pressure. It may be constructed light, but is at the same time strong and durable, and may be rapidly and effectually heated or cooled in all its parts.

What I claim as my invention, and desire to secure by Letters Patent, is—

A steam-table composed of two corresponding plates, in the inner surface of one or both of which is formed a continuous channel for the circulation of the heating or cooling agent, and having a groove containing an elastic packing, for the uses and purposes substantially as shown and described.

In testimony that I claim the foregoing improvement in steam-tables, as above described, I have hereunto set my hand this 25th day of March, 1881.

JOHN W. HYATT.

Witnesses:
CHAS. C. GILL,
HERMAN GUSTOW.